United States Patent [19]

Wood et al.

[11] 4,068,468
[45] Jan. 17, 1978

[54] STARTING METHOD AND SYSTEM FOR A GAS TURBINE

[75] Inventors: Palmer R. Wood, Scottsdale; James A. Rhoden, Phoenix, both of Ariz.

[73] Assignee: The Garrett Corporation, Los Angeles, Calif.

[21] Appl. No.: 582,007

[22] Filed: May 29, 1975

[51] Int. Cl.² .................. F02C 7/26; F04B 17/00; F04B 9/08
[52] U.S. Cl. ..................... 60/39.14; 417/323; 417/390; 417/397; 60/407
[58] Field of Search ............ 60/39.14, 39.07, 370, 60/407, 409; 417/323, 225, 390, 245, 28, 397; 137/487.5; 123/179 F

[56] References Cited

U.S. PATENT DOCUMENTS

| | | | |
|---|---|---|---|
| 1,015,464 | 1/1912 | Wilkins | 417/46 |
| 1,210,360 | 12/1916 | Poulson | 123/179 F |
| 1,338,443 | 4/1920 | Hawkins | 417/403 |
| 1,655,003 | 1/1928 | Woodford | 137/487.5 |
| 2,080,695 | 5/1937 | Cargile | 417/225 |
| 2,509,942 | 5/1950 | Sanford | 123/179 F |
| 2,516,291 | 7/1950 | Bartholomew | 417/28 |
| 2,582,848 | 1/1952 | Price | 60/39.14 |
| 2,665,839 | 1/1954 | Ostwald | 417/295 |
| 2,828,066 | 3/1958 | Wellauer | 417/245 |
| 2,970,546 | 2/1961 | White | 417/225 |
| 3,070,023 | 12/1962 | Glasgow | 417/397 |
| 3,157,993 | 11/1964 | Duttmann | 60/39.14 |
| 3,424,370 | 1/1969 | Law | 415/1 |

FOREIGN PATENT DOCUMENTS 343,579  2/1960  Switzerland .................. 60/39.07

*Primary Examiner*—Carlton R. Croyle
*Assistant Examiner*—Thomas I. Ross
*Attorney, Agent, or Firm*—James W. McFarland; Regis E. Slutter; Albert J. Miller

[57] ABSTRACT

A self-contained pneumatic starting system and method for initiating starting of a gas turbine machine includes a reservoir of pressurized gas which delivers motive gas flow to an expansion type pneumatic motor directly coupled to the compressor of the gas turbine machine for initiating rotation of the compressor during start up. Upon reaching self-sustaining speeds, the compressor delivers a flow of pressurized gas to replenish the reservoir for subsequent starting operation. A pressure amplifier increases the pressure of the recharging gas being supplied to the reservoir. Embodiments for driving the pressure amplifier both hydraulically and pneumatically are disclosed.

24 Claims, 8 Drawing Figures

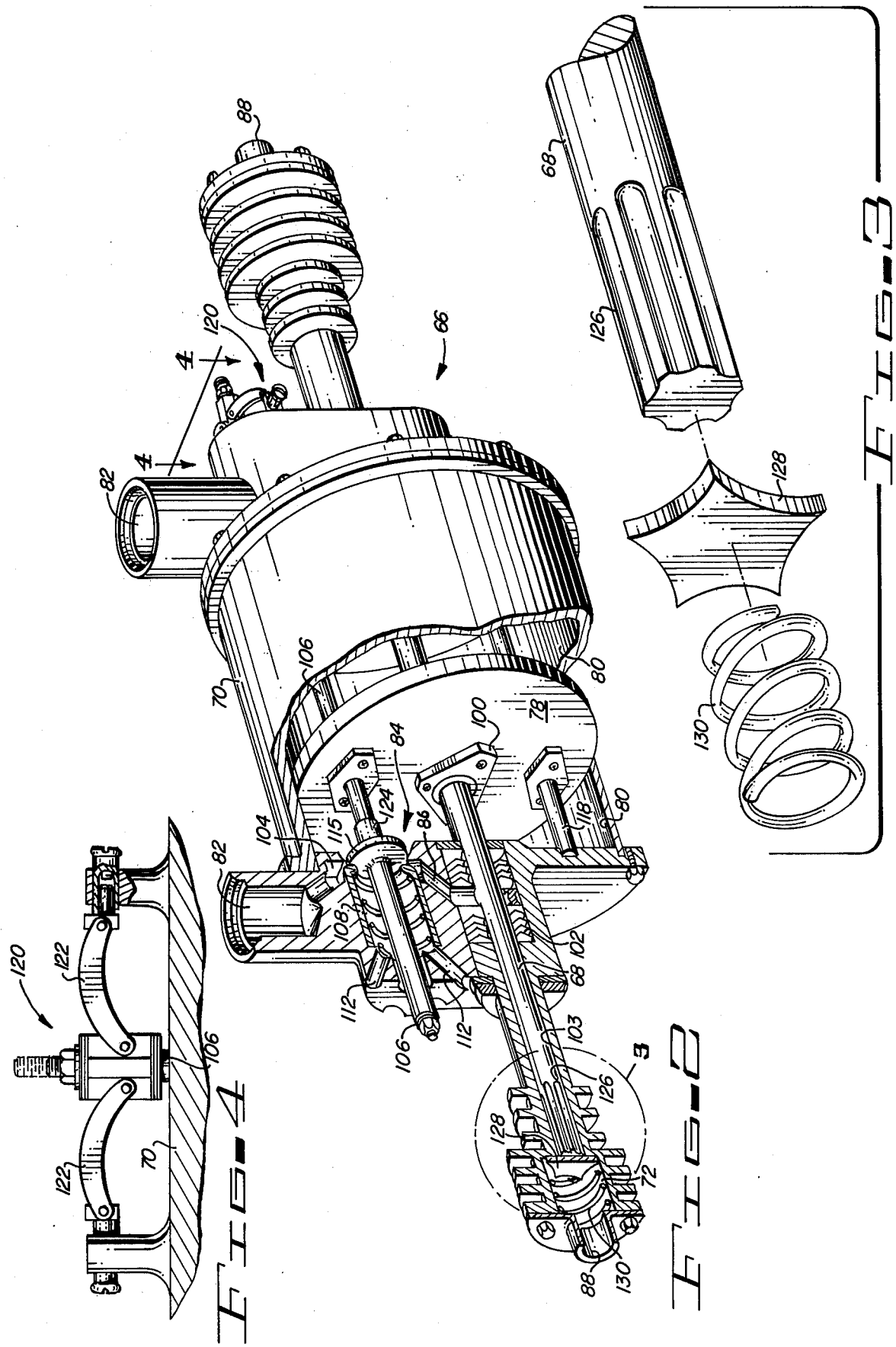

STARTING METHOD AND SYSTEM FOR A GAS TURBINE

BACKGROUND OF THE INVENTION

This invention relates to gas turbine machinery, and relates more particularly to self-contained starting systems carried with the machinery providing starting capabilities without utilization of external or ground support starting equipment.

Larger gas turbine machines such as gas turbine engines utilized in powering aircraft normally include a smaller gas turbine machine such as an auxiliary power unit and/or jet fuel starter which operate to assist in starting the larger engine, as well as providing power to drive auxiliary units of the aircraft. It has heretofore been found most commercially feasible and economical to provide external ground support equipment to accomplish starting of the main engine or engines. While certain types of self-contained starting systems have been developed and utilized in for highly sophisticated machinery such as military aircraft, these approaches generally have been too complicated and expensive for commercial exploitation. The overall expense, complexity, inefficiency, bulkiness and weight of such prior art self-contained start systems have severely limited their general utility. Most such self-contained starting systems have been of the hydraulic type, wherein hydraulic fluid is stored for use in starting the machinery; then during operation of the machine the hydraulic reservoir is replenished. Several drawbacks are associated with such hydraulic systems; primarily the weight and leakage restrictions of hydraulic systems have limited their utility. The hydraulic systems also encounter operational problems at low temperatures due to increased viscosity of the fluid.

While certain limited attempts have been made to provide a pneumatic, self-contained starting system, such arrangements have not met with much success primarily because of their operational efficiency. More particularly, most prior art pneumatic self-contained starting systems direct a supply of pressurized gas directly onto the compressor of the gas turbine machine for initiation of rotation thereof during start-up. Then during normal operation of the machine, the reservoir of pressurized gas is replenished. Because of the relative inefficiency of the compressor during its initial start-up, acceleration operation, it has been found that such prior art systems require an inordinately and unfeasibly large reservoir of pressurized gas to effect start-up even if the compressor of the turbine is not subject to any load. Of course to initiate acceleration of the gas turbine machine, normally a fairly substantial load is placed upon the compressor during start-up acceleration.

Other prior art types of self-contained starting systems are of the electrical type wherein stored-in electrical energy is discharged for start-up, and then stored during machine operation. Such electrical systems suffer from loss of battery power at low ambient temperatures, and generally are not sufficiently efficient systems for developing the necessary torque during start up. Particularly in aircraft installations, the substantial weight imposed upon the aircraft by a hydraulic or electrical self-contained starting system have greatly limited the applicability of each.

As a result of the general difficulties encountered in developing self-contained starting systems, most gas turbine machinery now rely either upon external equipment or throw-away, cartridge-type starters.

SUMMARY OF THE INVENTION

It is the primary object of the present invention to provide improved apparatus and method for starting a gas turbine machine without use of external equipment.

It is a more particular object of the present invention to provide a self-contained, pneumatic starter system and method which is carried with the gas turbine machine, the starter being of substantially lighter weight, greater efficiency, higher reliability, and greater economy both in structure and operation than prior art self-contained starting systems.

To this end, the invention contemplates a method of starting a rotary gas turbine machine by initiating starting of the machine upon delivering a flow of pressurized gas from a reservoir to a pneumatic motor to rotate the latter and effect rotation of the machine, the motor being directly mechanically coupled to the machine; then diverting away from the machine a portion of a flow of gas generated within the machine during its self-sustaining operation; and finally recharging the reservoir as necessary by delivering the diverted flow of gas to the reservoir at a pressure sufficient to effect actuation of the motor during a subsequent start-up operation of the machine.

Further, the invention contemplates a self-contained starting system which is carried with a gas turbine machine, the system including a pneumatic starter motor that is operably connected with the machine for directly rotating the latter upon motor actuation, a reservoir of pressurized gas, and control means for selectively delivering gas from the reservoir to the motor to actuate the latter to initiate starting of the gas turbine machine.

Another more particular object of the present invention is to provide apparatus and method as set forth in the preceding paragraphs, wherein there is provided pressure amplifier means for increasing the pressure of recharging gas being delivered back to the reservoir during self-sustaining operation of the machine.

Another particular object of the invention is to provide a pneumatic motor of the expanding type for starting the gas turbine machine, the expanding-type motor receiving rotational energy from the incoming gas flow both by the pressure differential generated across the motor by the pressurized gas, and by expansion of the gas while in the motor.

Yet another object of the invention is to provide in such a system and method as described in the preceding objects, wherein the pressure amplifier means is operably driven by the gas turbine machine to enhance the "self-contained" aspects of the invention. In one embodiment the pressure amplifier means is a reciprocating free piston driven by a pressurized flow of gas generated in the machine, while in another embodiment the reciprocating free piston is actuated by a flow of high-pressure hydraulic fluid developed by the machine.

These and other more particular objects and advantages of the present invention are specifically set forth in or will become apparent from the following detailed description of preferred forms of the invention when read in conjunction with the accompanying drawings.

BRIEF DESCRIPTION OF THE DRAWINGS

FIG. 2 is a perspective elevational view, with portions broken away to reveal internal details, of a pressure amplifier as utilized and contemplated by the present invention;

FIG. 3 is an exploded perspective view of portions of the amplifier within the circular-line of FIG. 2;

FIG. 4 is a top plan view as taken along lines 4—4 of FIG. 2;

DESCRIPTION OF THE PREFERRED EMBODIMENTS

Figure 1:
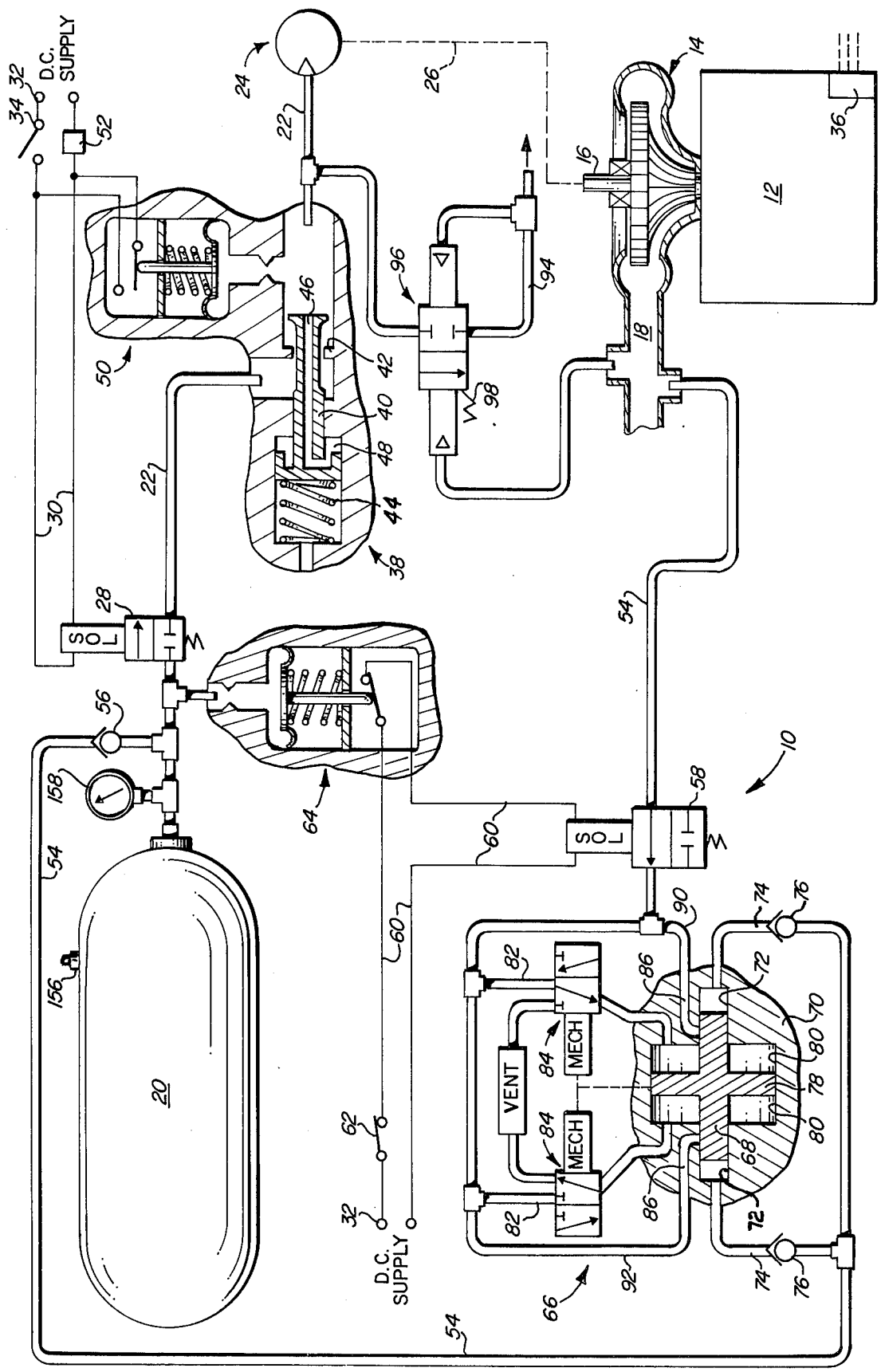
FIG. 1 is a partially schematic flow diagram of the starting system and method contemplated by the present invention.

Referring now to the drawings and more particularly to FIGS. 1-7, there is illustrated a pneumatic, self-contained starting system generally denoted by the numeral 10. The starter system is a self-contained unit incorporated within a prime mover engine which may include an auxiliary power unit as a portion of, or in combination with, a gas turbine machine 12 schematically depicted in FIG. 1. For instance, the gas turbine machine illustrated may be of the type supplying motive power to an aircraft, and conventionally includes an auxiliary power unit for driving the auxiliary systems of the aircraft as well as providing starting capabilities for the turbine machine. Conventionally, the auxiliary power unit is a gas turbine engine of substantially smaller size than the aircraft main turbine engine. Alternately to the auxiliary power unit, there may be instead a small gas turbine engine commonly referred to as a jet fuel starter, which acts only to start the machine. In any case, the gas turbine machine has a gas flow compressor, whether within the main turbine machine itself or in an auxiliary turbine unit. Such compressor may be a centrifugal-type gas compressor 14 as illustrated. High speed rotation of the compressor shaft 16 causes the compressor to generate a flow of gas within the machine and out a compressor exhaust passage 18.

In operation of the gas turbine machine, and assuming the compressor 14 is a stage of an auxiliary power unit, compressed gas from exhaust passage 18 is delivered into an appropriate combustion chamber to which combustible fuel is also fed. The hot, gaseous products are then delivered to drive a turbine which is operably coupled to the compressor of the larger, main gas turbine engine to start the latter. Once the main gas turbine engine reaches self-sustaining speeds, the auxiliary power unit may be decoupled therefrom, and rotary output power from the unit may then be utilized to drive auxiliary systems of the aircraft.

Starting system 10 generally includes a reservoir 20 for pressurized gas which is operably coupled through a first conduit 22 with an expanding type pneumatic starter motor 24 that is described in greater detail below. As depicted by dashed lines 26, starter motor 24 is directly connectable with compressor shaft 16 whereby actuation and rotation of motor 24 initiates starting and acceleration of shaft 16. Preferably, the drive connection 26 may include an overrunning clutch between motor 24 and shaft 16 to avoid drive of the motor by compressor 14.

An electrically energizable, solenoid operated, flow blocking control valve 28 is disposed in conduit 22 and illustrated in its normal de-energized position prohibiting pressure gas flow from the reservoir to motor 24. Valve 28 is connected by conductors 30 with an appropriate source of electrical power 32 across a switch 34. Upon closing switch 34 to complete the circuit between source 32 and valve 28, the valve is energized to its other position allowing flow from the reservoir to the motor. Preferably, switch 34 may be interconnected by appropriate circuitry with a speed or other parameter sensor 36 of the gas turbine engine such that valve 28 may be automatically shifted between its open and closed positions in response to the condition of machine 12.

Downstream of valve 28 is an automatic pressure regulating valve 38 which includes a longitudinal poppet 40 shiftable towards and away from a restrictor wall 42 in order to present a variable area orifice therebetween controlling gaseous flow through the first conduit 22. Working against the actions of a biasing spring 44, pressure in conduit 22 downstream of the variable restriction is transmitted through bore 46 into a closed pressure chamber 48 to drive the poppet leftwardly in opposition to spring 44. Valve 38 thereby operates automatically to control gaseous flow through the first conduit to maintain flow at a relatively constant preselected pressure. Also connected with conduit 22 to be responsive to pressure of gas therein, is a schematically illustrated, conventional pressure switch 50 operably connected with conductors 30 so as to de-energize solenoid valve 28 upon closing of switch 50 in response to over-pressurization in the first conduit downstream of pressure regulator valve 38. In the illustrated arrangement, pressure switch 50 is disposed in parallel with valve 28, and a resettable circuit breaker 52 opens whenever switch 50 closes to effect de-energization of valve 28.

A flow of gas generated within machine 12, such as the pressure flow in exhaust passage 18, may be utilized to recharge reservoir 20. A portion of this flow of gas is diverted from machine 12 into a second conduit 54 which is ultimately interconnected with reservoir 20 across a one-way, reverse flow check valve 56, in parallel flow relationship with the first conduit 22. Another electrically energizable, solenoid operated flow blocking control valve 58 is located in conduit 54 and illustrated in its energizable position permitting fluid flow from compressor exhaust passsage 18 to reservoir 20. Through appropriate conductors 60, valve 58 is connected with the electrical energy power source 32. Upon opening switch 62 which, similar to switch 34, may be appropriately connected with and automatically controlled by the speed or other parameter sensor 36 of machine 12, valve 58 is de-energized and shifts to its flow blocking position prohibiting recharging flow of pressurized gas to the reservoir. Another pressure sensing switch 64 is operably connected to conduit 22 so as to break the circuit between power source 32 and valve 58 and thereby de-energize the latter whenever pressure in conduit 22 and reservoir 20 exceeds a preselected value.

A pressure amplifier means 66, schematically depicted in FIG. 1, is disposed in conduit 54 between flow blocking valve 58 and check valve 56. The pressure amplifier includes a first, smaller, double acting piston 68 disposed within amplifier housing 70 and cooperating therewith to define a pair of variable volume chambers 72 at opposite ends of piston 68. Each chamber 72 communicates with reservoir 20 in parallel relationship through a pair of sub-conduits 74. An associated pair of one-way check valves 76 in sub-conduits 74 prevent direct communication between chambers 72 through sub-conduits 74. The pressure amplifier further includes means for driving piston 68 in a form of a second, larger, double acting reciprocating free piston 78 cooperating with housing 70 to define a second pair of larger variable chambers 80 on opposite sides of piston 78. Chambers 80 are alternately connectable with an ambient pressure vent or with pressurized gas supplied from compressor exhaust passage 18 by way of conduit 54 and gas pressure carrying conduits 82 so as to effect continuous reciprocal motion of piston 78 and piston 68. Gas flow in and out of chambers 80 are controlled by directional flow control valves 84 operably connected to piston 78 so as to shift connections between the opposing chambers 80 in response to the position of piston 78 within housing 70 to create the continuous reciprocating motion of pistons 78 and 68.

Housing 70 also includes inlet and outlet ports 86 and 88 that communicate with each of variable volume chambers 72. The outlet ports 88 are in constant communication with the respective chambers 72 for carrying higher pressure discharge gas flow therefrom towards the reservoir 20. The inlet ports 86 are respectively connected with conduit 54 via passages 90 and 92, and are disposed in the housing such that when piston 68 nears completion of its stroke in one direction, pressurized gas is delivered through the inlet port 86 into the chamber 72 that is at maximum volume. Movement of piston 68 controls communication between chambers 72 and the respective inlet ports 86.

The supply of pressurized air from reservoir 20 delivered through conduit 22 may also be utilized for other functions if desired. For instance, in FIG. 1 pressurized gas from conduit 22 may pass in parallel flow arrangement to an auxiliary function conduit 94. In the illustrated arrangement, gas flow from conduit 94 is delivered to the fuel supply system (not shown) which delivers fuel to the auxiliary power unit combustion chamber. To assure that the gas in conduit 94 is delivered to the combustion chamber, a nozzle boost valve 96 is disposed in conduit 94. Valve 96 is shiftable between its closed flow blocking position shown and an open position by the difference in pressure between the gas in conduit 94 downstream of valve 6, and the pressure of gas in exhaust passage 18. With the force a light biasing spring 98 assisting compressor exhaust pressure in opposing the pressure in conduit 94, control valve 96 regulates the flow through conduit 94 such that the pressure of gas in conduit 94 is slightly higher than the pressure of gas in exhaust passage 18. In this manner it is assured that a continuous flow into the combustion chamber to present an excess air, extra lean, fuel-air mixture in the combustion chamber.

One form of pressure amplifier structure 66 is illustrated in detail in FIGS. 2–5, wherein like numerals are utilized to refer to like elements shown schematically in FIG. 1. The larger driving free piston 78 traverses the interior cylindrical hollow of housing 72 to define a pair of larger variable volume chambers 80 on opposite sides of piston 78. The smaller free piston 68 is in the form of an elongated rod firmly secured to piston 78 by appropriate collar clamps 100. Piston 68 extends oppositely outwardly of the chambers 80 through an axially extending bore 103 in housing 70 and across appropriate sealing members 102. At opposite outer ends of housing 70 are defined the smaller variable volumes chambers 72 and outlet ports 88 communicating therewith.

Each of the supply conduits 82 at opposite ends of pressure amplifier 66 communicates directly with the respective inlet ports 86 via passages 104 which are also selectively communicable with the associated piston chamber 80 through the angular passages or openings 90 and 92 in the end wall portions of housing 70.

The flow control valve 84 include a valving rod 106 upon which piston 78 is freely slidable during its reciprocating motion within the housing, and a pair of identical valving units disposed at opposite ends of housing 70 in the regions of passages 104. Each valving unit includes a poppet sleeve 108 that is carried for reciprocal movement within an axial bore 110 of the housing. Through appropriate ducts 112, the outer end of bore 110 is vented to ambient pressure. As shown by the right hand valve 84 in FIG. 5, poppet sleeve 108 is biased leftwardly by a spring 114 into engagement with the end wall of housing 70 so as to break communication between passage 104 and the associated passage opening 90.

Figure 5:
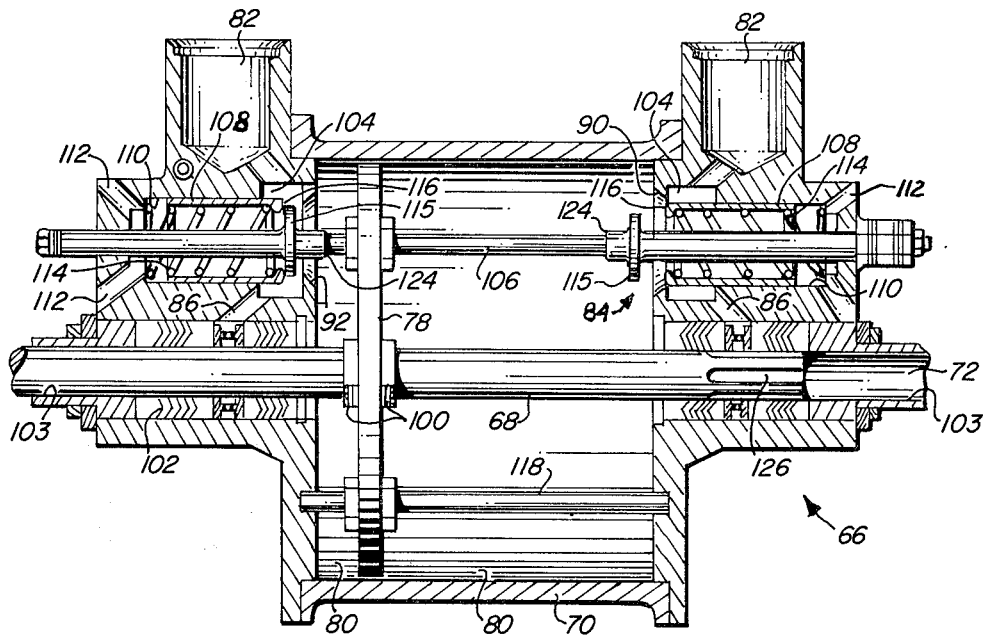
FIG. 5 is a partial cross-sectional view of the pressure amplifier of FIG. 2.

Each of valve unit 84 also includes a disc-like shoulder 115 carried on rod 106 so as to be engageable with an angular end wall 116 of poppet sleeve 108 as shown by the left-hand valve unit in FIG. 5. Engagement of shoulder 115 with end wall 116 serves two purposes: travel of rod 106 forces sleeve 108 leftwardly to allow communication from passage 104 through the associated passage opening 92 into piston chamber 80; and shoulder 115 sealingly contacts end wall 116 so as to prohibit gas flow from passage 104 through the interior of sleeve 108 to vent ducts 112.

On a side of piston 78 opposite the location of valving rod 106 is included a guide rod 118 for preventing binding of piston 78 during reciprocal movement thereof. To this end piston 78 is freely slidable upon guide rod 118.

The flow control valves 84 further include an overcenter, leaf spring biasing assembly 120 which includes a pair of resilient leaf springs 122 each pivotally connected at opposite ends with the housing 70 and valving rod 106. In the inward position of valving rod 106 as illustrated in FIG. 4, the leaf spring 122 biases rod 106 in a leftward direction with reference to FIGS. 2 and 5. Similarly, when valving rod 106 is shifted oppositely (upwardly in FIG. 4), springs 122 move over-center to bias and hold rod 106 in this opposite position. Valving rod 106 has appropriate stop collars 124 disposed near the opposite ends of the stroke of piston 78 so as to be engaged by the latter near the end of its strokes. When so engaged, piston 78 is effective to shift valve rod 106 to move sleeve 108 as described above, and to overcome bias of overcenter leaf springs 122. When valve rod 106 is shifted, for instance to its left hand position as shown in FIG. 5, the overcenter leaf springs 122 in combination with the pressure from passage 104 acting upon the associated shoulder 115, holds valve rod 106 in the described position. Similarly, when piston 78 moves rightwardly in FIG. 5 it ultimately engages the other stop collar 124 to overcome the bias of leaf springs 122 and shift the entire valving rod rightwardly and accomplish the valving flow control functions described previously.

The opposite ends of smaller piston 68 have a plurality of axially extending grooves 126 thereon which afford communication between the associated inlet port 86 and the housing bore 103, and thus the associated piston chamber 72 defined by bore 103. At both of the outer, larger diameter ends of bore 103 is disposed a disc-type check valve 128 (analogous to check valves 76 of FIG. 1), spring biased by a spring 130. Check valve 128 is capable of effecting sealing between the larger and smaller diameter portions of bore 103 in order to prevent reverse back flow of gaseous fluid from inlet port 88. At the same time, check valve 128 has a grooved outer periphery allowing fluid flow from chamber 72 outwardly to outlet port 88. Both the pressure of gas in bore 103 as well as the direct contact of piston 68 with check valve 128, are capable of shifting check valve 128 against the bias spring 132 to allow exhaust gas flow from bore 103. While only one end of pressure amplifier 66 is shown in cross sectional details in FIGS. 2 and 3, it will be understood that similar structures are incorporated at both ends of the pressure amplifier 66.

Figure 6:
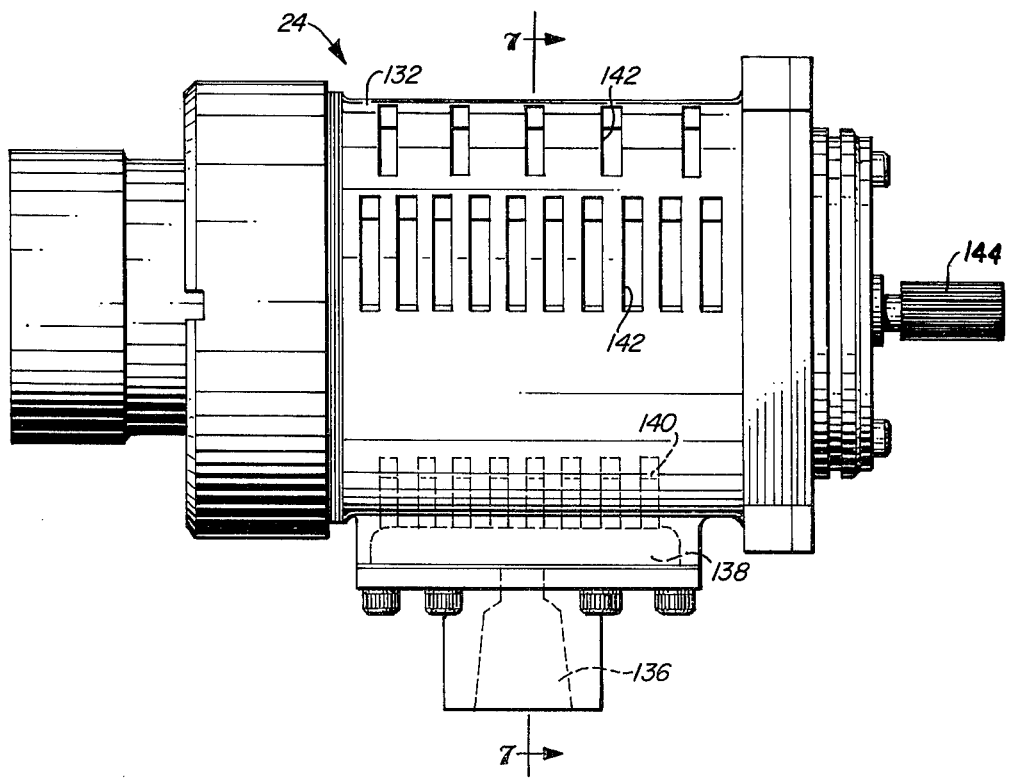
FIG. 6 is an elevational view of the expandable pneumatic motor as contemplated and utilized in the present invention.
Figure 7:
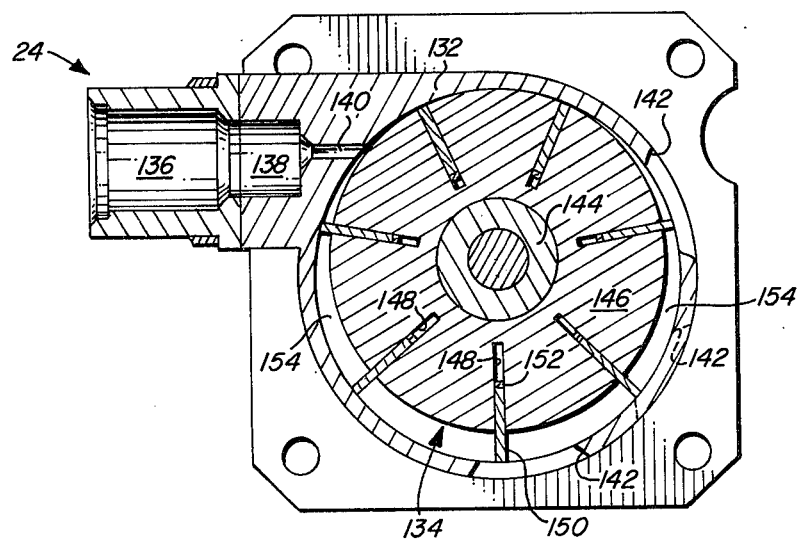
FIG. 7 is an axial cross-sectional view taken along lines 7—7 of FIG. 6.

FIGS. 6 and 7 illustrate the expansion type pneumatic starter motor in detail. Motor 24 includes an axially elongated outer housing 132 having a cylindrical interior cavity 134. Pressurized gas is delivered to the interior of the motor through an inlet port 136 which terminates in an elongated space 38 that communicates in turn with the interior cavity through a plurality of axially aligned and spaced drill holes 140. Angularly spaced about housing 132 are outlet ports 142 in the form of a plurality of milled slots in the angular housing. Preferably, as illustrated the outlet slots include several angularly spaced rows of slots 142.

A power output shaft 144 extends axially through housing 132 and is appropriately rotatably journaled at opposite ends thereof to the housing. Shaft 144 is disposed slightly off center and eccentric relative to the cylindrical interior cavity 134. Disposed within interior cavity 132 and rotatably secured to shaft 144 is a cylindrical barrel rotor element 146. The rotor has a plurality of radial slots 148 each of which extends substantially along the entire axial length of the barrel rotor 146. Movably disposed within each slot 148 is a vane 150 biased outwardly into engagement with the inner wall of cavity 134 by a spring 152 disposed within the associated slot 148. Vanes 150 cooperate with the housing to define a plurality of variable volume chambers 154 therebetween. It is important to note that the relative position of inlet port 136 and outlet port slots 142 allow the variable volume chambers 154 to be completely isolated from both the inlet and outlet ports during a substantial portion of power rotation of rotor 146 (counter-clockwise rotation of the rotor as viewed in FIG. 7).

In operation, the reservoir 20 in starter system 10 is initially charged from an external source via external port connection 156 to a preselected, desired pressure substantially greater than required to drive motor 24. Pressure of reservoir 20 may be monitored by a readout pressure gauge 158 is desired.

To start gas turbine machine 12, blocking valve 28 is energized by completing its associated circuitry to the electrical power supply 32, to allow pressurized gas to be delivered through conduit 22 to starter motor 24. Pressure regulating valve 38 regulates the pressure of gas in conduit 22 downwardly to a lower pressure prior to delivery thereof to the inlet port 136 of valve 24. By maintaining reservoir 20 at a substantially higher pressure than required to actuate valve 24, substantial savings of space result. The motive gas flow delivered to the inlet port of motor 24 fills the communicating variable volume chamber 154, and the difference in pressure between the gas in the inlet port 136 and ambient pressure drives rotor 146 in a counter-clockwise direction in FIG. 7. During that portion of rotation of the rotor wherein a variable volume chamber 154 is isolated from and traveling between the inlet and outlet ports, expansion of the pressurized gas within that variable volume chamber occurs. Such expansion provides additional kinetic energy for rotating the rotor and output shaft 144. Upon reaching the outlet port slots 142, the motive gas is discharged from the motor at ambient pressure.

By use of such an expansion type motor 24, the motor operates very efficiently in the present system for accelerating the compressor 14. Further, the starter motor shaft 144 may be directly coupled to the compressor shaft 16 without incorporation of gear reduction transmission to further reduce the weight of the overall starter system. Efficiency of the starter system is also augmented by its open loop arrangement: gas exhaust from motor 24 is to ambient, rather than through a closed loop to return to the reservoir 20 as characteristic hydraulic and certain pneumatic systems.

The compressor 14 accelerates under the urgings of motor 24 and begins delivering substantial quantities of pressurized air through its exhaust passage to the associated combustion chamber. The compressor and gas turbine machine 12 are accelerated by the starter motor up to a self-sustaining speed, for example approximately 40% of rated speed of the gas turbine machine, at which time the machine continues on in self-sustaining operation. Once the self-sustaining speed is reached, the switch 34 may be opened, either manually or in response to a speed sensor 36 associated with the machine 12. Blocking valve 28 is then de-energized to move to its flow blocking position and motor 24 comes to rest. Alternately, the motor may run until reservoir 20 is expended whereupon the overrunning clutch operably decouples the motor, such arrangement reducing the need for automatic valve 28. During delivery of motive flow to starter motor 24, any instance of overpressurization of conduit 22 downstream of the pressure regulating valve 38, causes responses switch 50 to close to de-energize the blocking valve and reduce gas flow through conduit 22.

During the self-sustaining operation of gas turbine 12, the recharging control switch 62 may be closed either manually or in response to a parameter sensor 36 associated with the machine, in order to energize flow blocking valve 58 to its open position allowing pressure gas flow from conduit 54 to the pressure amplifier 66.

This pressurized gas from conduit 54 is delivered into both supply conduits 82 of pressure amplifier housing 70 and into the associated passages 104. In the condition illustrated in FIGS. 2 and 5, the left-hand passage 104 is communicating with the left-hand larger variable volume chamber 82 to effect rightward driving pistons 78 and 68. The other, right-hand passage 104 is communicated via inlet port 86 and grooves 126 with the right-hand variable volume chamber 72. Due to the substantial difference in areas of piston 78 and 68, the gas flow out of the right-hand chamber 72, outlet port 88 and sub-conduit 74 to reservoir 20 is at a substantially higher pressure than gas flow from conduit 54 into the pressure amplifier.

As piston 78 nears the end of its rightward stroke, the right-hand stop collar 124 is engaged to shift valving rod 106 rightwardly, thereby interconnecting the right-hand passage 104 with the associated right-side chamber 80. Similarly, this rightward movement of valving rod 106 allows the left-hand poppet sleeve 108 to break communication between passage 104 and the left-hand chamber 80 while connecting this latter chamber with the left-hand vent ducts 112 through the center of the left-hand sleeve 108. Movement of piston 68 within bore 103 establishes synchronous valving interconnection of the inlet ports 86 with their associated variable volume chambers 72. Accordingly, it will be seen that the pistons 68 and 78 are driven in a continuous reciprocating action within housing 70, the engagement of piston 78 with stop collar 124 and associated shifting of valving rod 106 constituting means for sensing the position of piston 78 and thereupon reversing the communication of the two chambers 80 with conduit 54 and ambient pressure, to establish the continuing reciprocating action.

In this manner the pressure amplifier supplies recharging gas flow through conduit 54 across check valve 56 into reservoir 20 at a pressure substantially higher than that developed by compressor 14. Once pressure in the reservoir reaches the desired preselected value, pressure switch 64 opens the circuit to valve 58 to de-energize the latter and block pressure gas flow to the pressure amplifier. Thus, reservoir 20 is recharged to a pressure level sufficient to actuate starter motor 24 during the next starting operation of turbine machine 12. It will be apparent therefore, that the starting system 10 is self-contained with the gas turbine engine, and no external source of energy need be utilized to effect starting of the machine except, of course, the very initial charging of reservoir 20. No other starting mechanism need be included. System 10 acts alone to start motor 24, and electrical, cartridge-type or other start systems need not be incorporated as back-up to system 10. System 10 is capable of providing fast engine starting, and may be replenished within a matter of minutes to accomplish another start. In contrast, many prior art systems require several hours between starts.

In cases of malfunction the reservoir 20 may be replenished by external port connection 156 through use of an external source of pressurized gas, or by a hand pump. To further enhance the starting capabilities of system 10, additional backup bottles or reservoirs of pressurized gas may be incorporated within the system, preferably communicating with conduit 22 in parallel relationship with the reservoir at a location downstream of blocking valve 28 and upstream of regulating valve 38.

Figure 8:
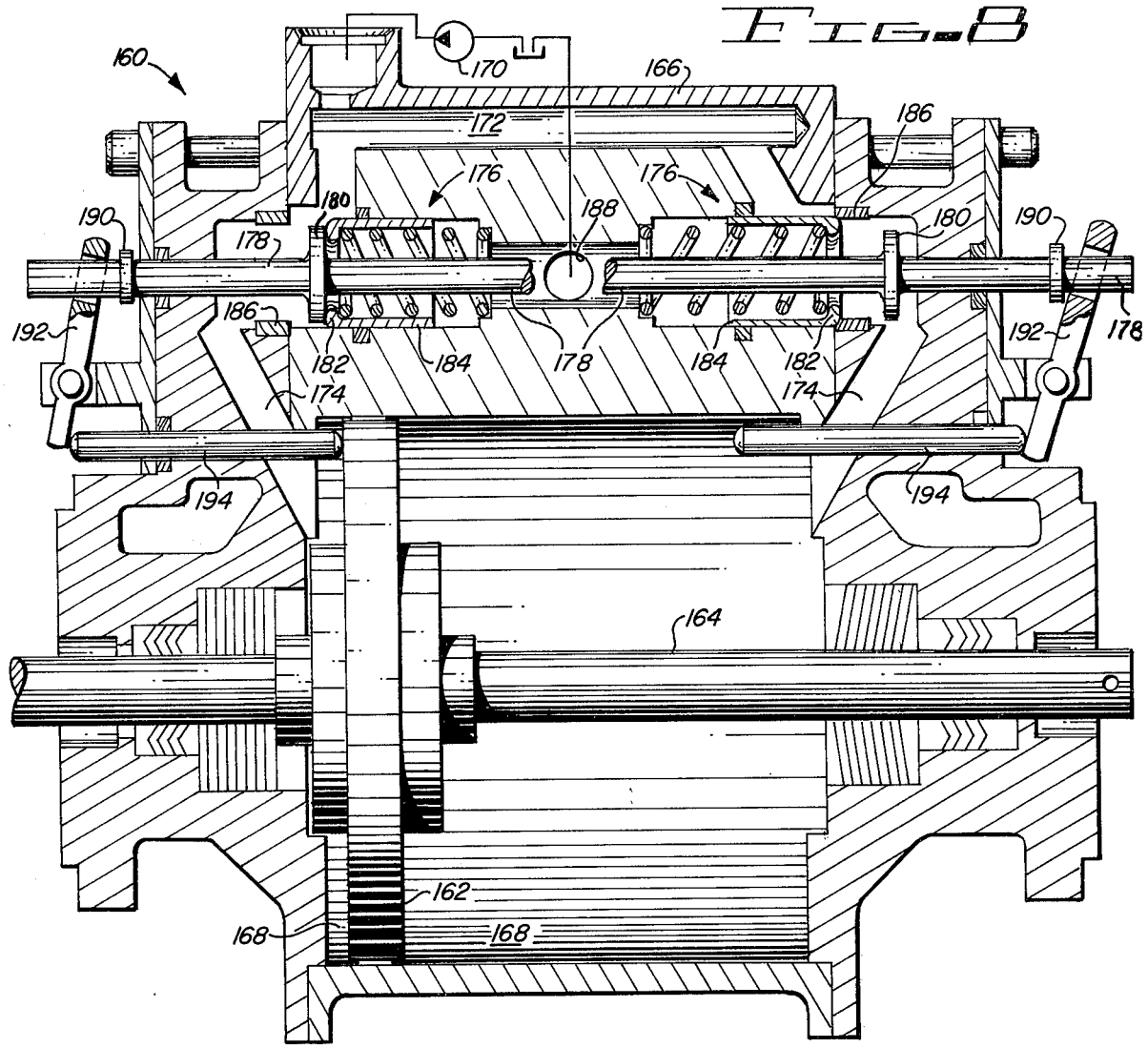
FIG. 8 is a partial cross-sectional view of another form of pressure amplifier as utilized and contemplated by the present invention, with portions shown schematically.

Another form of pressure amplifier 160, illustrated in FIG. 8, has the advantage of compactness in comparison to amplifier 66. Similar to pressure amplifier 66, this amplifier also includes larger and smaller free pistons 162 and 164 respectively reciprocal within a housing 166 so as to define a pair of larger variable volume chambers 168, and a pair of smaller variable volume chambers (not shown) at opposite ends of the smaller rod-like piston 164. In this arrangement the means for reciprocally driving the larger piston 162 includes a source of pressurized hydraulic fluid 170 which may conveniently be one of the hydraulic pumps driven and carried by the gas turbine machine. High pressure hydraulic fluid is delivered from pump 170 through a branched passage 172 to inlet ducts 174 at opposite ends of housing 166 respectively communicating with the associated variable volume chambers 168. Interposed across inlet ducts 174 are appropriate valving mechanisms 176, quite similar to the flow control valves 84 of the previous embodiment. The valve assemblies 176 include a single valving rod 178 having a pair of shoulders 180 thereon which are respectively sealingly engageable with an associated end wall 182 of poppet sleeve 184. The poppet sleeves 184 are spring biased outwardly into engagement either with the associated shoulder 180 or an appropriate seat 186 carried by housing 166. The hollow interiors of sleeves 184 communicate with a low pressure hydraulic fluid return port 188.

Stop collars 190 are carried by valving rod 178 exteriorly of housing 166 in positions to be engaged by associated levers 192. The opposite ends of the levers 192 that are pivotally mounted to housing 166 are positioned so as to be contacted by dowel pins 194. As illustrated in FIG. 8, movement of piston 162 towards the end of its stroke causes the piston to engage the associated dowel pin 194 and pivot lever 192 to shift valving rod 178 in the opposite direction. Similar to the previous embodiment of pressure amplifier, this movement of the valving rod effects reversal of connection of the two variable volume chambers with the higher pressure in passage 172 and the low pressure port 188.

The operation of pressure amplifier 160 is quite similar to pressure amplifier 66 with the exception that hydraulic fluid is utilized to drive piston 162. Reciprocating movement of piston 164 effects the appropriate valving and displacement of pressurized gas into and out of the chambers of associated with piston 164 in a manner similar to that previously described with respect to the FIG. 2 embodiment. For instance, in FIG. 8 valving rod 178 is shown in its rightward position wherein high pressure hydraulic fluid is delivered from pump 170 into the lefthand variable volume chamber 168 to drive pistons 162 and 164 rightwardly. During this rightward travel, high pressure gas is displaced from the right-hand gas pressure chamber associated with the smaller piston 164. Upon nearing the end of its rightward stroke, piston 162 engages the right-hand dowel pin 194 to effect leftward shifting of valving 178. As a result, the left-hand end wall 182 engages seat 186 to block communication of high pressure fluid to the left-hand chamber 168, and the right-hand shoulder 180 engages the associated end wall 182 to shift the right-hand poppet sleeve 184 rightwardly to deliver high pressure fluid to the right-hand chamber 168. At the same time the leftward movement of valving rods 178 has shifted the left-hand shoulder 180 away from the associated end wall to allow exhaust of fluid flow from the left-hand piston chamber 168 through the center of the left-hand poppet sleeve 184 to the exhaust port 188. In this manner it will be seen that a continuous reciprocating action of the pistons 162 and 164 results so long as pressurized fluid is being delivered from pump 170. It is preferable, of course, to incorporate a hydraulic flow control valve between the source of pressurized fluid and branch passage 172. Similar to the blocking valve 58 of FIG. 1, this hydraulic flow control valve may be responsive to an operating parameter sensor 36 of the gas turbine machine.

In both arrangements illustrated, it will be apparent that starter system 10 includes control means, including valves 28 and 58, which act during a first operational mode to deliver motive gas flow from the reservoir to motor 24 to start the machine, and act during a second mode to replenish the reservoir while the machine is running in self-sustaining operation.

While two specific embodiments of pressure amplifiers have been described above in detail, it will be apparent that various other types of pressure amplifier or pressure intensifer means may be utilized in place of the amplifier 66 or 160. More particularly, the pressure amplifier may be directly mechanically coupled and driven by the gas turbine machine during rotation thereof, instead of being driven by a supply of fluid, either gas or hydraulic liquid, developed by the gas turbine machine. Likewise, the flow of gas developed in the gas turbine machine which is utilized to replenish the reservoir 20, instead of being derived from the exhaust passage 18 of the auxiliary power unit compressor 14, may instead by any flow of gas developed in the gas turbine machine such as the compressor bleed air flow from the main turbine engine.

It will be apparent from the foregoing that the present invention provides an improved method of starting a prime mover engine having a rotary gas turbine machine there within, which includes the steps of initiating starting of the gas turbine machine by delivering a supply of pressurized gas to an expansion-type pneumatic motor 24 that is directly coupled to drive the compressor of the machine. Once the gas turbine machine reaches self-sustaining speeds, the flow of motive pressure gas to the starter motor may be interrupted either manually, automatically, in response to a parameter sensor associated with the turbine machine, or by exhaustion of the reservoir. To recharge the reservoir, the present method contemplates diverting at least a portion of a flow of gas, such as the exhaust flow in passage 18 of the compressor, away from the machine during the self-sustaining operation thereof. This diverted flow of gas is delivered to the reservoir at a pressure sufficiently high to effect actuation of the starter motor during the subsequent starting operation of the machine. Preferably for space and weight saving, the pressurized gas flow delivered to the reservoir is amplified in pressure to a level substantially higher than that required to efficiently drive the pneumatic motor. Then during the starting operation, the flow of gas delivered from the reservoir is regulated to a lower pressure for effecting efficient actuation of the starter motor 24. Inclusion of a one-way or overrunning clutch between the mechanical connection of the drive shafts of the starter motor and the turbine machine compressor allows the starter motor to be operably decoupled from the compressor during self-sustaining operation of the machine, while allowing direct coupling of the motor to the compressor during the starting operation. Preferably, the pressure amplifier is operated by the gas turbine machine during its self-sustaining operation.

Various modifications and alterations to the above-described specific embodiments will be apparent to those skilled in the art. Accordingly, the foregoing detailed description should be considered exemplary in nature and not as limiting to the scope and spirit of the invention as set forth in the appended claims.

What we claim is:

1. In combination with a gas turbine machine having a compressor:
   a reservoir for pressurized gas;
   an expanding rotary vane motor communicating with said reservoir and operably coupled to drive said compressor;
   means including a conduit between said motor and said reservoir, for connecting said reservoir with said motor and delivering pressurized gas from said reservoir to said motor to effect rotation of said compressor to initiate starting of said machine;
   pressure amplifier means connected with said reservoir and said compressor being supplied with gas at a first pressure from said compressor during operation of said machine, said amplifier means for delivering gas to said reservoir at a second pressure greater than said first pressure; and
   a pressure regulating valve disposed in said conduit operable to reduce pressure of gas supplied from said reservoir to a relatively constant preselected third pressure substantially less than said second pressure prior to delivery to said motor.

2. A starter system for a gas turbine machine, comprising:
   a reservoir for pressurized gas;
   an expanding rotary vane motor communicating with said reservoir and operably coupled to drive said machine in a first mode;
   charging means communicating with said reservoir for delivering pressurized gas thereto from said machine to recharge said reservoir;
   control means for selectively controlling flow of pressurized gas from said reservoir to said motor to actuate the latter and initiate starting of said machine during the first mode of operation of said system, said control means for interrupting said flow of gas from said reservoir to said motor and allowing said delivery of pressurized gas to said reservoir from said charging means so as to recharge said reservoir to recharge said reservoir during a second mode of operation of said system; and
   a pressure regulating valve communicating with said reservoir and said motor, operable to reduce pressure of said flow of gas supplied from said reservoir to a preselected, relatively constant lower level prior to delivery to said motor.

3. A method of starting a rotary gas turbine machine, comprising the steps of:
   delivering a starting flow of pressurized gas from a reservoir to an expanding rotary vane motor to actuate the latter, said motor operably coupled to rotate said machine;
   rotating said machine with said motor;
   generating a working gas flow through said machine by the rotation thereof;
   interrupting said starting flow of pressurized gas to said motor after said machine reaches a self-sustaining speed;
   diverting from the machine at least a portion of the working gas flow generated in the machine during said self-sustaining operation thereof;
   recharging the reservoir by delivering said diverted working gas flow to said reservoir;
   amplifying the pressure of said diverted working flow to a pressure sufficient to effect actuation of said motor during a subsequent starting of said machine; and
   regulating the pressure of said flow of pressurized gas being delivered to said motor during said starting step to a relatively constant preselected value substantially less than said pressure of gas in the reservoir.

4. A method as set forth in claim 3, further including the step of interrupting said recharging delivery of gas to said reservoir whenever pressure of gas in the reservoir reaches a preselected level.

5. A method as set forth in claim 4, further including the step of interrupting said recharging delivery of gas to said reservoir during said starting step regardless of the pressure of gas in said reservoir, 6. A method as set forth in claim 3, further including the step of coupling said motor to said compressor during said starting step, and operably decoupling said motor from said compressor during said self-sustaining operation of the compressor whereby the compressor does not drive said motor during self-sustaining operation of the said compressor.

7. A method as set forth in claim 3, further including the steps of: providing first and second conduits respectively connecting said reservoir with said motor and said machine whereby pressurized gas is delivered from said reservoir to said motor through said first conduit during said starting step, and pressurized gas is delivered from said machine to said reservoir through said second conduit during said recharging step; and preventing reverse flow of pressurized gas from said reservoir through said second conduit.

8. A prime mover engine having self-starting capabilities, comprising:
a gas turbine machine having a rotary compressor;
an expanding rotary vane starter motor operably directly connectable with said machine for effecting rotation of said compressor to initiate starting of said machine;
a reservoir for pressurized gas;
control means for selectively communicating said reservoir with said motor to actuate the latter and effect rotation of said compressor, said control means including a pressure regulating valve means for substantially reducing pressure of gas supplied from said reservoir; to a relatively constant preselected value and
pressure amplifier means operably connected with said reservoir and said compressor to be supplied with gas at a first pressure from said compressor during operation of said machine, said amplifier means operable to deliver gas to said reservoir at a second pressure greater than said first pressure for charging said reservoir during operation of said machine, thereby recharging said machine for repetitive starting without use of a source of energy external to said machine for actuating said motor.

9. A prime mover engine as set forth in claim 8, wherein said motor comprises a housing having an interior cavity and inlet and outlet ports respectively communicating with said interior cavity and inlet and outlet ports respectively communicating with said interior cavity at angularly spaced locations about said housing, a rotor located within said cavity eccentrically relative thereto, and a plurality of vanes reciprocally disposed in radial slots in said rotor and extending radially therefrom into engagement with said housing so as to divide said interior cavity into a plurality of variable volume chambers, said inlet and outlet ports being relatively located whereby said variable volume chambers are isolated from both said ports during a portion of rotation of said rotor to allow generation of power to rotate said rotor by expansion of said gas in said chambers while the latter are isolated from said inlet and outlet ports.

10. A prime mover engine as set forth in claim 8, further including a first conduit operably interconnecting said reservoir with said motor, and a pressure regulating valve disposed in said first conduit operable to reduce pressure of gas supplied from said reservoir to a preselected, lower level prior to delivery to said motor.

11. A prime mover engine as set forth in claim 10, further including a first blocking valve located in said first conduit normally disposed in a first position prohibiting fluid flow through said first conduit, said first blocking valve being shiftable to a second position allowing flow from said reservoir to said motor through said first conduit.

12. A prime mover engine as set forth in claim 11, wherein said first blocking valve comprises a first electrically energizable, solenoid operated, flow control valve, there being included means for selectively energizing and de-energizing said valve to respectively shift the latter between its first and second positions.

13. A prime mover engine as set forth in claim 11, further including a second conduit extending between said reservoir and said compressor, said pressure amplifier means being disposed in said second conduit, said first and second conduits communicating with said reservoir in parallel flow relationship.

14. A prime mover engine as set forth in claim 13, further including a second blocking valve disposed in said conduit between said compressor and said pressure amplifying means, said second blocking valve having a position prohibiting flow of gas through said second conduit, there being included means for actuating said second blocking valve to an open, flow permitting position allowing flow of gas from said compressor to said pressure amplifier means.

15. A prime mover engine as set forth in claim 14, wherein said second blocking valve comprises a second electrically energizable, solenoid operated, flow control valve, said means for actuating said second blocking valve including means for selectively energizing and de-energizing said valve to shift the latter between its flow permitting and flow blocking positions.

16. A prime mover engine as set forth in claim 15, wherein said means for actuating said second blocking valve includes means operably coupled with said second blocking valve and said reservoir for de-energizing said second blocking valve and shifting the latter to its flow blocking position whenever pressure of gas in said reservoir reaches a preselected level.

17. A prime mover engine as set forth in claim 13, further including a one-way check valve disposed in said second conduit between said reservoir and said pressure amplifying means for preventing reverse flow of gas from said reservoir to said pressure amplifier means through said second conduit.

18. A prime mover engine as set forth in claim 8, wherein said pressure amplifier means is operably coupled with said machine to be operably driven thereby.

19. A prime mover engine as set forth in claim 18, wherein said pressure amplifier means includes a housing having a first piston mounted for reciprocal movement within said housing and cooperating therewith to define a first variable volume chamber in the housing, said housing having an inlet port communicating with said compressor and communicable with said first chamber to supply gas at first pressure into said chamber, said housing having an outlet port communicating with said first chamber and said reservoir for delivering gas at said second pressure thereto, said pressure amplifier means further including means operably coupled with said machine for reciprocally driving said first piston to increase the pressure of said gas in the first chamber from said first pressure to said second pressure.

20. A prime mover engine as set forth in claim 19, wherein said means for driving said first piston includes a second piston reciprocally mounted within said housing and operably coupled with said first piston to drive the latter, said second piston cooperating with said housing to define a second variable volume chamber therewithin, said second piston and second chamber being respectively substantially larger than said first piston and first chamber.

21. A prime mover engine as set forth in claim 20, wherein said means for driving said first piston further includes means for selectively admitting pressurized fluid into said second chamber to drive said first and second pistons in a direction increasing the volume of said second chamber while decreasing the volume of said first chamber.

22. A prime mover engine as set forth in claim 21, wherein said means for admitting pressurized fluid to said second chamber is selectively operable to allow exhaust of said pressurized fluid from said second chamber to permit return movement of said first and second pistons in a direction opposite to said first direction.

23. A prime mover engine as set forth in claim 22, wherein said first and second pistons are of the double acting type respectively cooperating with said housing to define a pair of first variable volume chambers and a pair of second variable volume chambers respectively disposed on opposite sides of said first and second pistons, said pair of first chambers communicating with said reservoir in parallel flow relationship, said means for admitting fluid being operable to alternately admit said pressurized fluid to one and then the other of said second chambers whereby to reciprocally drive said first and second pistons.

24. A prime mover engine as set forth in claim 23, wherein is included means for preventing direct communication between said pair of first chambers.

25. A prime mover engine as set forth in claim 23, wherein is included means for sensing the position of said second piston within said housing, said sensing means being operably coupled with said means for admitting fluid to control the latter in a manner effecting said alternating admission of pressurized fluid to said pair of said second chambers.

26. A prime mover engine as set forth in claim 25, wherein said means for admitting fluid includes a source of pressurized gas alternately communicating with said pair of second chambers.

27. A prime mover engine as set forth in claim 23, wherein said means for admitting fluid includes duct means extending between said compressor and said pair of second chambers to alternately supply pressurized gas at said first pressure to said pair of second chambers to drive said pistons.

28. A prime mover engine as set forth in claim 23, wherein said means for admitting fluid includes a source of pressurized hydraulic fluid carried by said engine.

29. In combination:
a gas turbine machine having a rotatable shaft and a gas compressor mounted to said shaft, said machine adapted to generate a flow of gas during operation thereof;
a reservoir for storing pressurized gas at a preselected pressure;
a first conduit communicating with said reservoir;
an expanding rotary vane type pneumatic motor means communicating with said first conduit, having a rotary power output shaft directly connectable to said shaft of the machine to drive said compressor connecting said reservoir and means for receiving pressurized gas from said first conduit to generate power and for initiating rotation of said compressor both by pressure of said gas delivered to said motor as well as by expansion of said gas while in said motor;
a first control valve disposed in said first conduit selectively shiftable between a first position prohibiting flow of pressurized gas through said first conduit, and a second position allowing flow of pressurized gas to said motor to actuate the latter and start said machine;
a pressure regulating valve means in said first conduit downstream of said first control valve for regulating pressure of said pressurized gas in said first conduit to a relatively constant level lower than said preselected pressure prior to delivery to said motor;
a second conduit extending between said machine and said reservoir, conducting recharging gas to said reservoir from said flow of gas in said machine;
a second control valve disposed in said second conduit selectively shiftable between first and second positions respectively prohibiting and allowing recharging flow of pressurized gas through said said conduit;
means in said conduit for preventing reverse gas flow therethrough from said reservoir to said machine; and
pressure amplifier means in said second conduit downstream of said second control valve and upstream of said means for preventing reverse flow, for raising the pressure of said recharging flow of gas to said preselected pressure level, said pressure amplifier means being driven by said recharging flow of gas in said second conduit.

* * * * *

UNITED STATES PATENT AND TRADEMARK OFFICE
CERTIFICATE OF CORRECTION

PATENT NO. : 4,068,468

DATED : Jan. 17, 1978

INVENTOR(S) : James A. Rhoden; Palmer R. Wood

It is certified that error appears in the above-identified patent and that said Letters Patent are hereby corrected as shown below:

In the cover page under "U.S. Patent Documents," add
--3,098,626   7/1963   Messinger ........ 60/39.14--.

Column 12, delete lines 39 through 68.

Column 13, delete lines 1 through 21; line 35, delete the semicolon (;); line 36, after "value" insert a semicolon --;--.

Column 14, line 61, after "at" insert --said--.

Column 16, line 18, delete "connecting said reservoir and", and insert in lieu thereof --,said motor--.

Signed and Sealed this

Sixteenth Day of May 1978

[SEAL]

Attest:

RUTH C. MASON
Attesting Officer

LUTRELLE F. PARKER
Acting Commissioner of Patents and Trademarks